(12) United States Patent
Hergt et al.

(10) Patent No.: US 9,140,129 B2
(45) Date of Patent: Sep. 22, 2015

(54) TURBOMACHINE WITH AXIAL COMPRESSION OR EXPANSION

(75) Inventors: Alexander Hergt, Bonn (DE); Robert Meyer, Dallgow (DE); Ralf-Dietmar Baier, Munich (DE)

(73) Assignee: MTU Aero Engines GmbH, Munich (DE)

( * ) Notice: Subject to any disclaimer, the term of this patent is extended or adjusted under 35 U.S.C. 154(b) by 633 days.

(21) Appl. No.: 13/508,258

(22) PCT Filed: Nov. 2, 2010

(86) PCT No.: PCT/EP2010/066621
§ 371 (c)(1),
(2), (4) Date: Jun. 28, 2012

(87) PCT Pub. No.: WO2011/054812
PCT Pub. Date: May 12, 2011

(65) Prior Publication Data
US 2012/0263587 A1    Oct. 18, 2012

(30) Foreign Application Priority Data

Nov. 6, 2009 (DE) .................. 10 2009 052 142

(51) Int. Cl.
*F01D 9/04* (2006.01)
*F01D 5/14* (2006.01)

(52) U.S. Cl.
CPC ............... *F01D 5/145* (2013.01); *F01D 9/041* (2013.01); *F05D 2240/127* (2013.01); *F05D 2270/17* (2013.01); *Y02T 50/673* (2013.01)

(58) Field of Classification Search
CPC ......... F01D 5/141; F01D 5/145; F01D 5/146; F04D 2240/127
USPC ....................... 415/191, 211.2, 914
See application file for complete search history.

(56) References Cited

U.S. PATENT DOCUMENTS

| 3,039,736 A | 6/1962 | Pon |
| 4,208,167 A | 6/1980 | Yasugahira et al. |
| 5,803,602 A * | 9/1998 | Eroglu et al. .................. 366/337 |
| 6,419,446 B1 | 7/2002 | Kvasnak et al. |
| 6,561,761 B1 * | 5/2003 | Decker et al. ............... 415/173.1 |
| 6,884,029 B2 * | 4/2005 | Beeck ........................... 415/191 |
| 2007/0081898 A1 * | 4/2007 | Matsuda et al. ........... 416/193 A |

FOREIGN PATENT DOCUMENTS

| DE | 2841616 A1 | 3/1979 |
| DE | 19834647 A1 | 2/2000 |

(Continued)

OTHER PUBLICATIONS

International Search Report dated Dec. 29, 2012 from corresponding International Patent Application No. PCT/ EP2010/066621—4 pages.

*Primary Examiner* — Ninh H Nguyen
(74) *Attorney, Agent, or Firm* — Maier & Maier, PLLC

(57) ABSTRACT

The turbomachine has a ring of radial blades which are connected to an annular end wall. Situated on the end wall upstream of each blade is a deflector wedge with two divergent guide surfaces. The deflector wedge generates pressure-side and suction-side vortices of which the vortices caused by the blade cascade are altered such that the transverse flow and backflow areas on the blade are reduced, and therefore the edge zone losses are decreased.

6 Claims, 2 Drawing Sheets

(56) References Cited

FOREIGN PATENT DOCUMENTS

Figure 3:
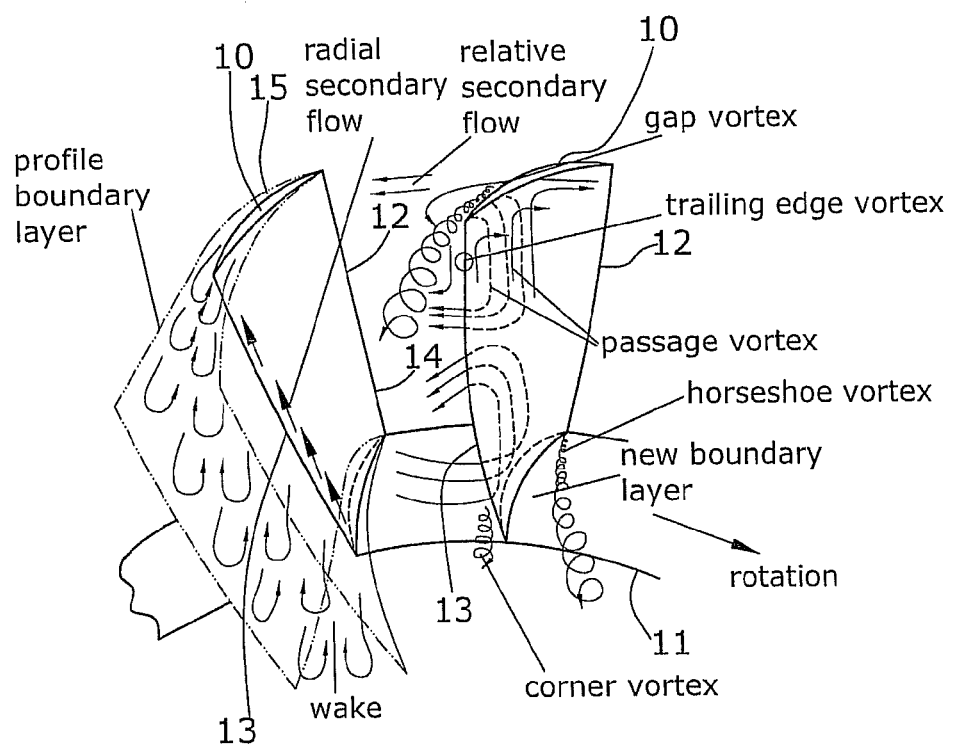

| DE | 102006057063 B3 | 7/2008 |
|----|----|----|
| EP | 1074697 A2 | 2/2001 |
| EP | 1688586 A1 | 8/2006 |
| EP | 1927723 A1 | 6/2008 |
| GB | 2248885 A | 4/1992 |
| JP | 52054808 A | 5/1977 |

* cited by examiner

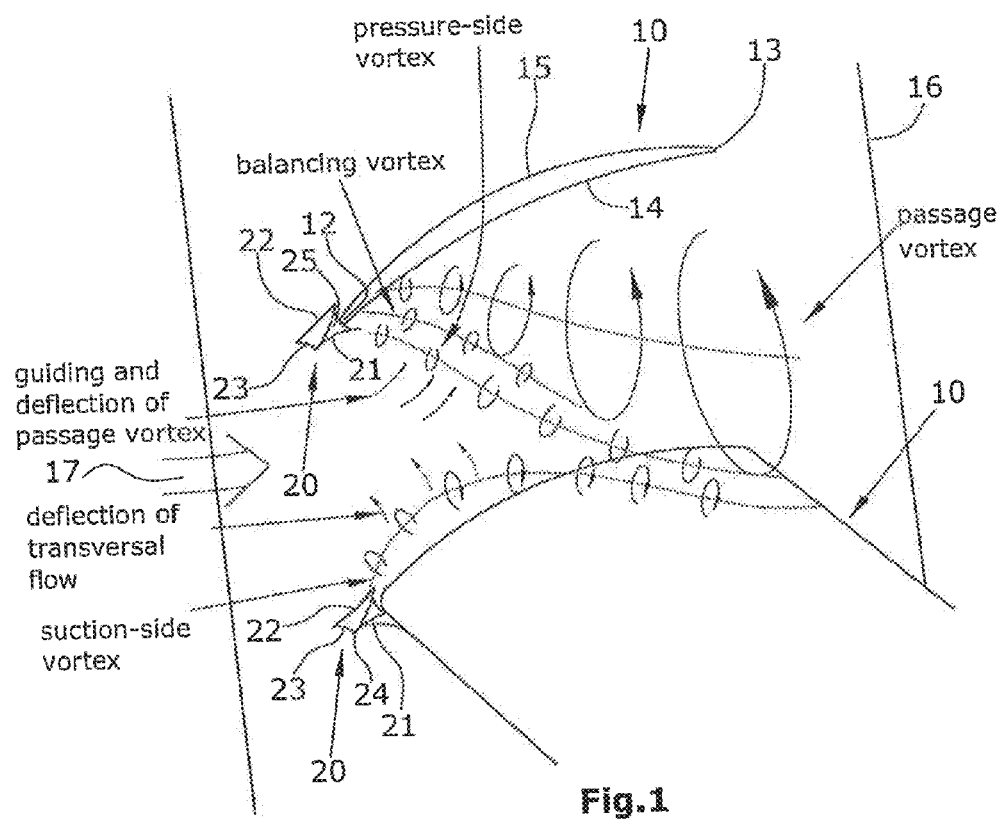
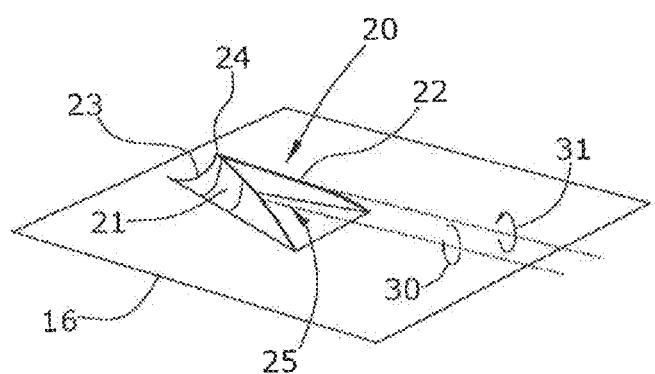

TURBOMACHINE WITH AXIAL COMPRESSION OR EXPANSION

RELATED APPLICATIONS

This is the U.S. national stage application which claims priority under 35 U.S.C. §371 to International Patent Application No.: PCT/EP2010/066621 filed on Nov. 2, 2010, which claims priority to German Patent Application No. 102009052142.9 filed on Nov. 6, 2009, the disclosures of which are incorporated by reference herein their entireties.

The invention refers to a turbomachine with axial compression or expansion, comprising a ring of blades whose radially outer ends are connected to an annular end wall and which each have a leading edge, a trailing edge, a pressure side and a suction side.

In traversing guide or rotor blade cascades of turbomachines losses occur that limit the efficiency of the rows of blades and thus of the entire machine. These flow losses can substantially be divided into friction losses at the surfaces (blade, as well as hub and housing walls) and losses due to secondary flows in the edge zone area of the blade cascades. Specifically, the reduction of the secondary flow losses is an essential part of the research in the field of compressor technology, since, given the ever rising demand for energy and a continuously increasing air traffic volume, the pollution of the environment by $CO_2$ can only be counteracted by more efficient gas turbines and aircraft engines.

Influencing and reducing the secondary flow and the losses resulting therefrom has been among the central issues over the last decades, especially in compressor aerodynamics. Since the very flow conditions in the edge zones between the blades and the hub and housing walls are characterized by complex vortex systems and secondary flows, a specific influencing thereof amounts to a scientific challenge.

FIG. 3 illustrates the essential secondary flows and vortex structures as formed in a compressor cascade. This also includes secondary flows that may be formed due to a radial gap between the blade and the radially outer end wall. FIG. 3 illustrates two blades 10 of a blade ring. At their radially inner ends, the blades are connected to a hub 11, while their radially outer ends are connected to an outer ring forming the end wall and not illustrated in the drawing. Thus, the blades form a blade cascade which may be a stator or a rotor of a compressor. The blades 10 each have a leading edge 12, a trailing edge 13, a pressure side 14 and a suction side 15. The pressure side 14 is concave in shape, while the suction side 15 is convex. Due to the higher flow velocity occurring on the suction side 15, the pressure is low there. On the pressure side 14, however, an increased pressure builds at the compressor cascade. In the area of the leading edge 12 (front edge), the boundary layer is rolled up at the hub 11 (with stators, this may also happen at the housing wall), so that a so-called horseshoe vortex is formed there. Further, due to the pressure gradient between the pressure side of a blade and the suction side of the neighboring blade, a transverse flow is formed in the passage at the limiting walls of the hub and the housing. Two oppositely rotating passage vortices result from this transverse flow, which transport low energy boundary layer material at the hub and housing wall into the corner region between the wall and the pressure side of the blade. The strong deceleration of the flow in the blade cascade causes a massive flow separation in the area of the corner. Significant total pressure losses in the blade passage result from this separation and the backflow areas existing on the blade and the walls, which losses become ever more dominant as the blade height ratio decreases. Accordingly, a further increase in the efficiency of modern compressors clearly is a function of a reduction of these losses.

A turbomachine which forms the basis of the preamble of claim 1 is described in U.S. Pat. No. 6,419,446 B1. This turbomachine is a gas turbine. In the transition areas to the end walls, deflector wedges adjoin the leading edges of the blades, which wedges each taper in the upstream direction. The deflection wedges have convexly curved guide surfaces. They form "shoes", as it were, which protrude forward at the end zones of the leading edge.

Further, a turbomachine configured as an axial compressor is described in DE 198 34 647 C2.

This axial compressor comprises a ring of blades having their outer ends connected to an end wall. The blades are provided with auxiliary blades that protrude from the suction side of the blade and which are angled against the local flow prevailing at the respective location, whereby a longitudinal vortex is formed in the wake of the auxiliary blade which induces a velocity from the center of the blade height to corner flows. Since the auxiliary blade is mounted in the area of the corner flow, it influences the corner flow by transporting, due to a rotational movement, fast-flowing fluid from the outer flow along the blade surface associated with the auxiliary blade to the slow corner flow, accelerating the same and thereby preventing the separation thereof. Further, the auxiliary blade has the effect that it channels and thereby accelerates the corner flow. Moreover, this causes the auxiliary blade to act as a fence that keeps slow-flowing fluid of the corner flow from mixing with the faster flow around the blade center.

DE 10 2006 057 063 B3 describes an axial compressor, wherein a plurality of transverse lamellae is arranged at an end wall above a blade, the chord lengths of the lamellae decreasing with the increasing distance from the suction side of the stator blade. In this manner, it is intended to reduce the losses by flow separation at the walls and to achieve an improvement in efficiency.

The known solutions require an increased production effort. Often, the passage from the experimental phase to the practical implementation is not altogether resolved, since the structural strength and the durability of the components, which are sometimes heavily stressed, have to be improved.

It is an object of the invention to provide a turbomachine, wherein the total pressure losses at the blade passage are reduced with relatively simple means, whereby an increase in efficiency is achieved.

The turbomachine of the invention has the features of claim 1. It is characterized in that the height of the guide surfaces with respect to the end wall decreases in the downstream direction from a common peak.

The invention is based on the idea of a purposeful influence on the generation and formation or propagation of the passage vortex and on the transverse flow at the end wall by the generation of two strong vortices. The deflector wedge forms the vortices as a pair directly in front of the blade leading edge. This vortex pair is formed by a suction-side vortex and a pressure-side vortex. The rotational direction of the suction-side vortex is such that, in the area of the end wall, it rotates against the transverse flow and deflects the same at the front portion of the blade. In this way, the accumulation of low-energy boundary layer material in the corner region is reduced and the onset of the separation is delayed.

The invention essentially relies on the use or replacement of existing flow structures in the edge zone area of a compressor cascade, since the new vortex pair superposes the weak horseshoe vortex. Contrary to active influencing measures, no additional energy is required that would be introduced into the flow, but the existing energy of the flow is deflected and used to influence the flow. Other than with the use of vortex generators, the vortices produced are not intended to mix or energize the boundary layer, but the flow is intended to be deflected and guided purposefully. This means that the novel influencing method does not act against the characteristic structures of the edge zone flow, which generally leads to additional losses, but that the existing flow energy is deflected. The generation of the vortex pair can be achieved by even a slight modification of the end wall and can therefore be realized with little structural and manufacturing effort. Because of the simple geometric shape of the end wall modification, an adaptation to different blade systems, inflow boundary layers and working ranges of compressor cascades can readily be made.

In a preferred embodiment of the invention it is provided that the guide surfaces start at a common bow line. The same may rise in a concave shape from the end wall so that it offers little flow resistance to the oncoming flow and causes no substantial vortex formation itself.

Preferably, the guide surfaces of the deflector wedge are concave in shape in order to produce vortices rotating in opposite directions. However, concave guide surfaces are not necessarily required to achieve the effect of the invention. The guide surfaces may also be plane, for example.

The maximum height of the deflector wedge preferably is 5-8% of the radial blade length. It depends essentially on the special geometry of the blades. The invention can be used both with straight blades and with bow blade systems where the blades have a bow-shaped radial extension. The deflector wedge forms a forward wedge, as it were, set in front of the leading edge of the blade in the end wall area. In this area, it guides the oncoming flow past the leading edge of the blade and at the same time guides it away from the end wall. The deflector wedge may be formed as a hollow wedge comprising a free space into which the leading edge of the blade extends.

The turbomachine of the invention refers both to axial compressors and axial turbines.

The following is a detailed description of an embodiment of the invention with reference to the drawings.

In the Figures:

FIG. 1 illustrates two blades in the area of the end wall, as well as the vortex systems forming on the pressure side and the suction side of the blades, FIG. 2 an enlarged view on the deflector wedge, and FIG. 3 an illustration of the secondary flows and vortices in an axial compressor cascade according to Hübner (1996).

FIG. 1 illustrates two blades 10 that form a ring together with further blades and protrude radially from a hub (not illustrated). The radially outer end of the blades 10 are connected to an annular end wall 16. The hub and the end wall together with the blades form the so-called blade cascade.

Each blade 10 has a front leading edge 12 and a rear trailing edge 13. The bottom face forms a pressure side 14 and the top face forms a suction side 15. With a rotor, the entire blade cascade rotates. Contrary to that, the entire blade cascade of a stator is stationary and an airflow flows against the same. In FIG. 1, the oncoming flow is indicated by an arrow 17.

Upstream of each blade 10 a deflector wedge 20 is fastened to the end wall 16 in front of the respective leading edge 12.

The deflector wedge has two guide surfaces 21, 22 diverging in the upstream direction and merging into a common bow line 23 at the front end, as illustrated in FIG. 2. The bow line 23 rises progressively from the end wall 16 and ends in a peak point 24, where the deflector wedge has its maximum height. Downstream of this peak point the height of the guide surfaces 21, 22 decreases continuously to zero. The guide surfaces 21, 22 are concave in shape, so that they have a partially tubular contour. Between the guide surfaces 21, 22, a free space 25 exists into which the leading edge 12 of the adjoining blade protrudes. However, it is also possible that the blade is positioned at a distance behind the deflector wedge.

FIG. 1 also illustrates the vortices formed by the guide surfaces 21, 22. These are a pressure-side vortex 30 formed by the guide surface 21, and a suction-side vortex 31 formed by the guide surface 22. In the FIGS. 1 and 2 the directions of rotation of the respective vortices are draw, too. It is evident from FIG. 1 that, at the end wall 16, the suction-side vortex 31 deflects the transverse flow in the frontward area of the blade, due to its direction of rotation. The structure of the vortex systems formed by a pressure-side vortex 30, balancing vortex and passage vortex is also illustrated in FIG. 1. In addition, the direction of the deflection and of the guiding of the passage vortex by the pressure-side vortex is shown.

Due to the deflector wedge, the horseshoe vortex forming at the end wall is superposed or replaced with a high-energy vortex, whereby the forming of the passage vortex is shifted rearward with respect to the flow direction. The pressure-side vortex 30 acts as a guide for the passage vortex. This leads to a reduction of the transverse flow and backflow areas on the blade and thus to a reduction of the edge zone losses.

The invention claimed is:

1. A turbomachine with axial compression or expansion, comprising a ring of blades whose radially outer ends are connected to an annular end wall and which each have a leading edge, a trailing edge, a pressure side and a suction side, wherein a deflector wedge is provided on the end wall in front of the leading edge, seen in the upstream direction, the deflector wedge having two guide surfaces arranged at the sides of the deflector wedge and diverging in the downstream direction that generate pressure-side and suction-side vortices, wherein the height of the guide surfaces with respect to the end wall decreases in the downstream direction from a common peak.

2. The turbomachine of claim 1, wherein the guide surfaces start in a common bow line.

3. The turbomachine of claim 2, wherein the bow line rises from the end wall onward.

4. The turbomachine of claim 1, wherein the guide surfaces are concave so as to generate vortices rotating in opposite directions.

5. The turbomachine of claim 1, wherein the maximum height of the deflector wedge is 5-8% of the radial blade length.

6. The turbomachine of claim 1, wherein a free space exists between the guide surfaces, into which the leading edge of the blade protrudes.

* * * * *